(12) United States Patent
Lambrecht et al.

(10) Patent No.: US 11,914,489 B2
(45) Date of Patent: Feb. 27, 2024

(54) REDUNDANT CONTROL IN A DISTRIBUTED AUTOMATION SYSTEM

(71) Applicant: GESTALT Robotics GmbH, Berlin (DE)

(72) Inventors: Jens Lambrecht, Berlin (DE); Thomas Staufenbiel, Berlin (DE); Eugen Funk, Berlin (DE); The Duy Nguyen, Berlin (DE)

(73) Assignee: Gestalt Robotics GMBH, Berlin (DE)

( * ) Notice: Subject to any disclaimer, the term of this patent is extended or adjusted under 35 U.S.C. 154(b) by 0 days.

(21) Appl. No.: 17/834,406

(22) Filed: Jun. 7, 2022

(65) Prior Publication Data
US 2022/0398174 A1 Dec. 15, 2022

(30) Foreign Application Priority Data
Jun. 10, 2021 (EP) .................. 21178683

(51) Int. Cl.
*G06F 11/20* (2006.01)
*G06F 11/00* (2006.01)
(Continued)

(52) U.S. Cl.
CPC ........ *G06F 11/2025* (2013.01); *G06F 11/004* (2013.01); *G06F 11/008* (2013.01);
(Continued)

(58) Field of Classification Search
CPC .. G06F 11/2025; G06F 11/004; G06F 11/008; G06F 11/0709; G06F 11/0739;
(Continued)

(56) References Cited

U.S. PATENT DOCUMENTS

2015/0378356 A1* 12/2015 Hefeeda ............. G05B 19/4185
700/9
2016/0048434 A1* 2/2016 Bibelhausen ...... G05B 19/0428
714/4.12
(Continued)

FOREIGN PATENT DOCUMENTS

EP 3916555 A1 12/2021

OTHER PUBLICATIONS

J. Lambrecht, E. J. Steffens, M. Geitz, A. Vick, E. Funk and W. Steigerwald, "Cognitive Edge for Factory: a Case Study on Campus Networks enabling Smart Intralogistics," 2019 24th IEEE Int. Conf. on Emerging Technologies and Factory Automation (ETFA), Zaragoza, Spain, 2019, pp. 1325-1328 (Year: 2019).*
(Continued)

*Primary Examiner* — Bryce P Bonzo
*Assistant Examiner* — Michael Xu
(74) *Attorney, Agent, or Firm* — Caesar Rivise, PC (57) ABSTRACT

A method for redundant control in a distributed automation system, preferably a real-time automation system, for operating a client device of the distributed automation system is discussed. The method includes using the client device to monitor for the occurrence of a fault in communication between the client device and a first computing infrastructure that is part of the distributed automation system and operates the client device. The method may also include using the client device, once the fault occurs, to instruct a second computing infrastructure of the distributed automation system to operate the client device.

16 Claims, 2 Drawing Sheets

(51) Int. Cl.
  *G06F 11/07* (2006.01)
  *G06F 11/14* (2006.01)
  *G06F 11/34* (2006.01)
(52) U.S. Cl.
  CPC ...... *G06F 11/0709* (2013.01); *G06F 11/0739* (2013.01); *G06F 11/0757* (2013.01); *G06F 11/0793* (2013.01); *G06F 11/1443* (2013.01); *G06F 11/2005* (2013.01); *G06F 11/2028* (2013.01); *G06F 11/3452* (2013.01); *G06F 2201/805* (2013.01)
(58) Field of Classification Search
  CPC ............ G06F 11/0757; G06F 11/0793; G06F 11/1443; G06F 11/2005; G06F 11/2028; G06F 11/3452; G06F 2201/805; G05D 2201/0216; G05D 1/0297; G05B 19/0428; G05B 2219/24176; B25J 9/161; B25J 9/1682
  See application file for complete search history.

(56) References Cited

U.S. PATENT DOCUMENTS

| | | | | |
|---|---|---|---|---|
| 2020/0159609 | A1* | 5/2020 | Korotaev | G06F 11/079 |
| 2020/0204428 | A1* | 6/2020 | Sasidharan | G06F 11/079 |
| 2020/0401936 | A1* | 12/2020 | Embarmannar Vijayan | G06N 20/00 |
| 2021/0158635 | A1* | 5/2021 | Liu | G07C 5/085 |
| 2021/0374573 | A1 | 12/2021 | Lambrecht | |
| 2022/0122385 | A1* | 4/2022 | Lisoski | G05B 19/0428 |
| 2022/0266906 | A1* | 8/2022 | Kurokawa | B60W 10/04 |
| 2023/0011677 | A1* | 1/2023 | Li | B60W 60/00186 |
| 2023/0098996 | A1* | 3/2023 | Tseng | G01R 31/50 714/39 |

OTHER PUBLICATIONS

Lambrecht et al., "Cognitive Edge for Factory: A Case Study on Campus Networks Enabling Smart Intralogics", 24th IEEE International Conference on Emerging Technologies and Factor Automation, pp. 1325-1328 (2019).

Eloranta et al., "Fault Tolerance Patterns for Distributed Machine Control Systems", 15th European Conference on Pattern Languages of Programs, Article No. 23, pp. 1-14 (2010).

European Search Report for related European Patent Application No. 21178683.5 dated Nov. 29, 2021.

* cited by examiner

REDUNDANT CONTROL IN A DISTRIBUTED AUTOMATION SYSTEM

CROSS-REFERENCE TO RELATED APPLICATIONS

This application claims the benefit under 35 U.S.C. § 119(a) of European Patent Application No. 21178683.5 filed on Jun. 10, 2021 entitled REDUNDANT CONTROL IN A DISTRIBUTED AUTOMATION SYSTEM, and whose entire disclosure is incorporated by reference herein.

FIELD OF DISCLOSURE

This disclosure relates to a method for redundant control in a distributed automation system. This disclosure also relates to a distributed automation system and a computer program product.

BACKGROUND

Cloud and edge computing enable the flexible use of external computing power, and in a scalable and service-oriented manner. This is increasingly also of interest for the computer-based control of mobile or stationary machines or display devices, as these are otherwise subject to the restrictions of the locally installed computer infrastructure (on-premise or local calculations generally via industrial PCs or embedded hardware).

The use of external computing resources by outsourcing software functions can bring various advantages due to the theoretically infinite computing power. For example, it is possible to compute powerful and complex AI algorithms and to calculate different functions in parallel simultaneously. Higher availability of mobile devices or machines, e.g. mobile transport systems (AGVs), AR/VR glasses, can be achieved by outsourcing computing power. There are lower requirements on the local hardware of the machines. Various benefits can also be realized throughout the life cycle of the equipment/software, such as simpler commissioning, updates on-the-fly, seamless integration of M2M communication and value-added services, easy sharing of knowledge and information, transparency and enabling of new business models (e.g. Pay per Use) using monitoring services, seamless switching between simulation and real devices in software development, etc.

On this basis there is also increasing motivation to outsource control and visualization functions as well as sensor data processing with hard or soft real-time requirements. Traditionally, this means that an open control or processing cycle or closed control loop should or must be maintained and, if the external software services do not respond, the device functions are limited or even not possible.

It is possible for virtualization techniques, such as in a public cloud, to support redundancy. The redundancy can only be supported within the private infrastructure, e.g. by providing redundancy for individual software services. It is also possible that redundancy concepts for real-time requirements can be supported at the network level, e.g. by time-critical networking. These can require special hardware, e.g. switches or routers, to detect and compensate for connectivity problems (failure or performance/QoS faults) on individual routes. In these approaches, the redundancy of the network connection can be used permanently and existing resources can thus be permanently allocated.

Accordingly, there is a need for a real-time redundancy concept capable of practical application in the event of a failure or (temporary) malfunction of the communication channels or an entire infrastructure, and which can enable a seamless continued functioning of the devices or machines while preferably treating both the communication and the computing infrastructure as an integral whole.

A benefit of the invention is to create an improved technology for redundant control for a distributed automation system, in which a client device is operated by an external computing infrastructure.

SUMMARY OF THE INVENTION

The benefits may be achieved via features of the independent claims. Examples of advantageous developments may be specified in the dependent claims and the description.

One aspect of the present disclosure relates to a method for redundant control in a distributed automation system, preferably a real-time automation system, for operating a client device of the distributed automation system. The method may include monitoring for faults in the communication between the client device and a first computing infrastructure (e.g. server computing infrastructure) that is part of the distributed automation system and operates the client device. The method may include using the client device to instruct a second computing infrastructure (e.g. server computing infrastructure) of the distributed automation system to operate the client device when a fault occurs (e.g. upon detecting the occurrence of a fault).

The method advantageously allows the provision of redundancy (e.g. active and/or passive) under the control of the client device in a distributed automation system, which can be applied particularly preferably when using real-time critical or potentially insecure software services to guarantee the operation of the client device in the event of a fault. Preferably, the client device can thereby provide compensation for temporary or long-term failures of individual communication channels and/or the first computing infrastructure in a distributed automation system in which real-time critical software functions are outsourced. The method is preferably benefits from the fact that no special network infrastructure is required to create redundancies. The method can preferably also benefit from the fact that an integrative treatment of the computing and network resources is made possible by using the client device to carry out the monitoring of the communication for the occurrence of the fault.

In one exemplary embodiment, the instruction to the second computing infrastructure is issued via a continuously active communication link between the client device and the second computing infrastructure. This means that the second computing infrastructure can advantageously respond very quickly to take over the operation of the client device. Preferably, the second computing infrastructure can be operated as a hot redundancy with respect to the first computing infrastructure.

In another exemplary embodiment, the instruction of the second computing infrastructure comprises establishing a communication link between the client device and the second computing infrastructure, initiated via the client device. This advantageously enables a resource-saving form of redundancy. Preferably, the second computing infrastructure can be operated as warm, cold, or standby redundancy with respect to the first computing infrastructure.

In a further exemplary embodiment, the method also comprises using the client device to instruct the second computing infrastructure to terminate the operation of the client device once the fault is eliminated, and/or using the client device to terminate communication with the second computing infrastructure once the fault is eliminated. This means that it is advantageously possible to rely on the first computing infrastructure for operating the client device again as early as possible, which can be particularly resource-saving, for example, with regard to the only temporary use of the second computing infrastructure and communication with the same.

In a further exemplary embodiment, the method also comprises using the client device to instruct the first computing infrastructure to operate the client device again once the fault is eliminated. Optionally, the method can also comprise transferring a current status model, which specifies a current status of the client device, and/or a current environment model, which specifies a current environment of the client device, from the client device and/or the second computing infrastructure to the first computing infrastructure for use when operating the client device (again). It is also thus advantageously possible to rely on the first computing infrastructure to operate the client device again as early as possible, which can be particularly resource-saving. In addition, the first client device can particularly advantageously rely on an updated status model of the client device for operating the client device (again).

In another exemplary embodiment, the client device is a machine, a robot (e.g. stationary or mobile), a terminal device, or a preferably autonomous vehicle.

In one embodiment, the fault comprises a disconnection of the communication, a communication failure, a violation of a predefined maximum response time (e.g. by the first computing infrastructure), a violation of a predefined minimum data transfer speed (e.g. with the first computing infrastructure), and/or a deviation from a quality of service requirement on the communication.

In another embodiment, the method also comprises operating the client device independently in the event of a fault with a reduced functionality compared to the operation using the first computing infrastructure, until the second computing infrastructure operates the client device. Alternatively, when the fault occurs the client device can be used to carry out either the instruction of the second computing infrastructure or (respectively) an independent operation of the client device with a reduced functionality in comparison to the operation via the first computing infrastructure, preferably depending on the fault that has occurred, on a status of the client device, and/or a status of the second computing infrastructure.

In another embodiment, the client device is operated by the first computing infrastructure via a (e.g. constantly updated) status model which indicates a current status of the client device, and the method also comprises transferring, preferably continuously transferring, the status model from the first computing infrastructure to the second computing infrastructure while the first computing infrastructure operates the client device. The method can optionally also comprise use of the transferred status model via the second computing infrastructure to operate the client device, while the second computing infrastructure operates the client device when the fault occurs. This advantageously ensures that the second computer infrastructure always has an up-to-date status model of the client device available for a potential redundant operation via the second computer infrastructure.

In another embodiment, the client device is operated by the first computing infrastructure via an (e.g. constantly updated) status model which indicates a current status of the client device, and the method also comprises transferring, preferably continuously transferring, the status model from the first computing infrastructure to the second computing infrastructure while the first computing infrastructure operates the client device. The method can also optionally include transferring the transferred status model to the second computing infrastructure via the client device to operate the client device when instructing the second computing infrastructure. This can advantageously ensure that the second computer infrastructure has an up-to-date status model of the client device available for redundant operation via the second computing infrastructure at the time the operation of the client device is taken over.

It is possible that the client device is operated by the first computing infrastructure using an (e.g. constantly updated) environment model which specifies a current environment of the client device, and the method may also include transferring, preferably continuously transferring, the environment model from the first computing infrastructure to the second computing infrastructure while the first computing infrastructure operates the client device. The method can optionally also comprise use of the transferred environment model via the second computing infrastructure to operate the client device, while the second computing infrastructure operates the client device when the fault occurs. This advantageously ensures that the second computer infrastructure always has an up-to-date environment model of the client device available for a potential redundant operation via the second computer infrastructure.

It is possible that the client device is operated by the first computing infrastructure using an (e.g. constantly updated) environment model which specifies a current environment of the client device, and the method may also include transferring, preferably continuously transferring, the environment model from the first computing infrastructure to the client device while the first computing infrastructure operates the client device. The method can also optionally include transferring the transferred environment model to the second computing infrastructure via the client device to operate the client device when instructing the second computing infrastructure. This can advantageously ensure that the second computer infrastructure has an up-to-date environment model of the client device available for the redundant operation via the second computing infrastructure at the time the operation of the client device is taken over.

In one embodiment variant, the method also comprises predicting an occurrence of a fault in the communication between the client device and the first computing infrastructure based on a current location of the client device, a quality-of-service monitoring of the communication, and/or historical information about previous communication between the client device and the first computing infrastructure. This can advantageously be used to anticipate potential faults or an increased risk of faults occurring.

In a further embodiment variant, the method also comprises, when predicting the occurrence of the fault, using the client device to instruct the second computing infrastructure to operate the client device during a period of time for which the fault was predicted. Alternatively, the method can comprise, when predicting the occurrence of the fault, independently operating the client device with a reduced functionality compared to the operation using the first computing infrastructure during a period of time for which the fault was predicted.

In a further exemplary embodiment, the method comprises using the client device and/or the first computing infrastructure device to decide whether the second computing infrastructure is operated at least temporarily as a hot redundancy or as a warm, cold or standby redundancy with respect to the first computing infrastructure, preferably depending on a status of the client device, a status of the first computing infrastructure, the communication between the client device and the first computing infrastructure and/or a prediction of the occurrence of a fault in the communication between the client device and the first computing infrastructure. This can advantageously achieve resource optimization while ensuring an optimal redundancy strategy.

Optionally, the method can also comprise operating the second computing infrastructure as a hot redundancy or as a warm, cold, or standby redundancy, depending on the decision.

In another exemplary embodiment, the distributed automation system comprises an additional client device (e.g. configured or designed in the same way as the client device), and the method also comprises using the additional client device for monitoring for the occurrence of a fault in the communication between the additional client device and a third computing infrastructure (e.g. server computing infrastructure) of the distributed automation system that operates the additional client device. Optionally, the method can also comprise using the additional client device to instruct the second computing infrastructure of the distributed automation system to operate the additional client device when the fault occurs. This means that the method can advantageously be scaled in a resource-saving manner.

Another aspect of the present disclosure concerns a distributed automation system having a client device, a first computing infrastructure, and a second computing infrastructure (and optionally an additional client device), wherein the distributed automation system is configured to carry out a method as disclosed herein. The distributed automation system can advantageously achieve the same advantages as those already described herein for the method.

Another aspect of the present disclosure concerns a computer program product having at least one computer-readable storage medium with instructions stored thereon that instruct one or more computers to carry out a method as disclosed herein. The computer program product can advantageously achieve the same advantages as those already described herein for the method.

The preferred embodiments and features of the invention described above can be combined with each other as desired.

It is also pointed out that the term "control" used herein may refer to open-loop tasks and/or closed-loop control tasks and/or processing tasks, depending on the configuration of the distributed automation system. Even when the term "control" is used herein, it may also include or mean "regulate" or "control with feedback" and/or "process" as appropriate. For the control, a set of electronics (e.g. with microprocessor(s) and data memory) is preferably available on the client device, the first computing infrastructure, and the second computing infrastructure.

BRIEF DESCRIPTION OF THE DRAWINGS

Further details and advantages of the invention are described below with reference to the attached drawings. In the drawings.

The embodiments shown in the figures are at least partially identical, so that similar or identical parts are provided with the same reference signs and in order to explain them reference is also made to the description of the other embodiments or figures, in order to avoid repetition.

DETAILED DESCRIPTION

Figure 1:
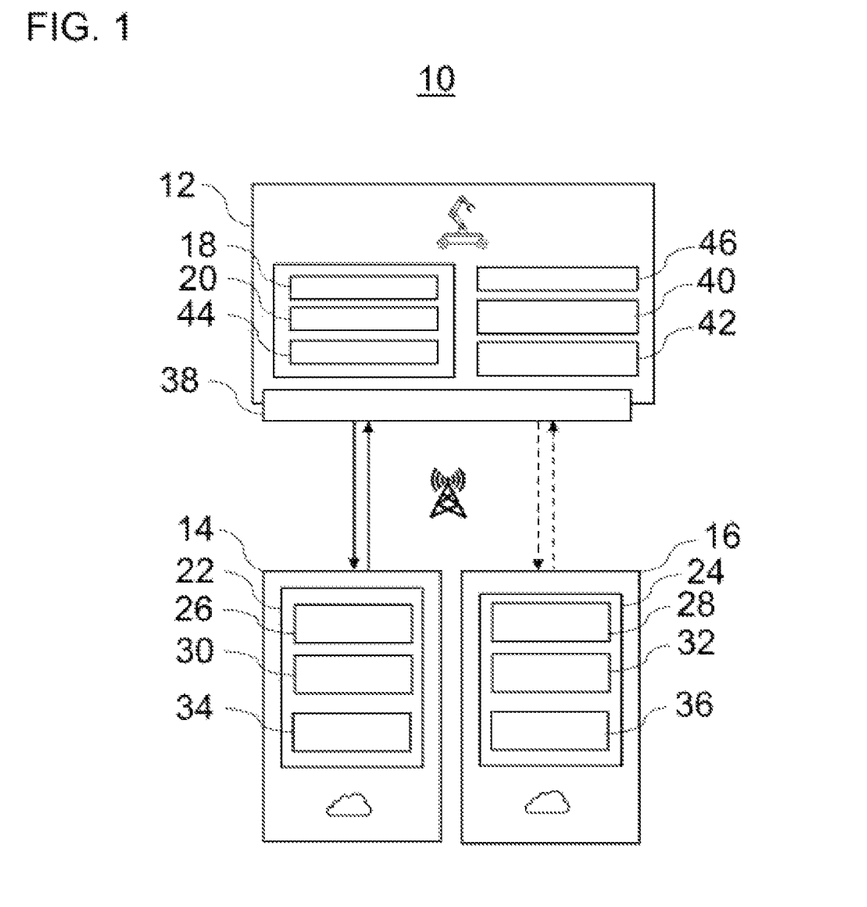
FIG. 1 shows a schematic, simplified representation of a distributed automation system according to an exemplary embodiment of the present disclosure.

FIG. 1 shows an exemplary distributed automation system 10. The distributed automation system 10 comprises a client device 12, a first computing infrastructure 14, and a second computing infrastructure 16. In the distributed automation system 10, the client device 12 can be operated partially or completely automatically, preferably externally to the client device 12 via the first computing infrastructure 14 in normal operation and via the second computing infrastructure 16 in redundant operation.

The client device 12 can be mobile or stationary. For example, the client device 12 can be designed for indoor and/or outdoor applications. The client device 12 can be any type of device that allows computing power to be outsourced to an external computing infrastructure. This preferably involves outsourcing computationally intensive problems to the first computing infrastructure 14 or, in redundant operation, to the second computing infrastructure 16. For example, the client device 12 can be any type of machine, vehicle or terminal device. The client device 12 is particularly preferably implemented as a transport system or a stationary or mobile robot, for example as an automated guided vehicle (AGV) for material transport. It is also possible to implement the client device 12, for example, as an automated/autonomous motor vehicle or as a (user) terminal device (e.g. AR/VR data glasses, desktop PC, smartphone, tablet, laptop, terminal, etc.). The client device 12 is particularly preferably a mobile robot with autonomous navigation, e.g. for material transport.

The first and second computing infrastructure 14, 16 can be any type of device to which computing power can be outsourced from the client device 12. For example, the computing infrastructure 14 and/or 16 can be a cloud server device, an edge server device, or any other server device.

The first and second computing infrastructure 14, 16 are provided separately from each other and separately from the client device 12. The first and second computing infrastructure 14, 16 can each have dedicated computing hardware (e.g. microprocessor(s), memory, etc.). It is possible for the first and second computing infrastructure 14, 16 to be arranged in the same data centre or in different data centres.

The client device 12 can communicate with the first and second computing infrastructure 14, 16 by wires and/or wirelessly. It is possible that the first and second computing infrastructure 14, 16 can communicate with each other using a wired and/or wireless connection. The client device 12, the first computing infrastructure 14, and the second computing infrastructure 16 can each have a communication interface for communication.

A wired communication can be implemented, for example, via a BUS system or Ethernet. For example, a wireless communication can be possible over a LiFi communication network (light fidelity=optical wireless technology for data transmission in the light spectrum), a WiFi communication network (wireless fidelity=IEEE 802.11-based wireless network), a 4G communication network, and/or a 5G communication network, etc. At least one communication protocol can be used for the communication, e.g. TCP/IP.

It is possible for the client device 12 to be connected via a plurality of different communication channels (e.g. LiFi channel, WiFi channel, 4G channel, 5G channel, BUS system and/or Ethernet, etc.) to the first computing infrastructure 14 and/or the second computing infrastructure 16. It is also possible to switch between the different communication channels, e.g. in the event of a fault or a connection interruption of a communication channel. The switching can be initiated by the client device 12 or by the respective computing infrastructure 14 or 16. The switching can comprise activating the communication channel to which it is intended to switch. The activation can be initiated by the client device 12 or by the respective computing infrastructure 14 or 16. For example, the client device 12 can be connected via a communication channel A, for example WiFi, to the first computing infrastructure 14. If communication channel A malfunctions, a communication channel B, e.g. 4G or 5G, can be activated to (re-)connect the client device 12 to the first computing infrastructure 14. The activation causes a switchover to the communication channel B. Switching back may also be possible.

The first and second computing infrastructure 14, 16 can each operate the client device 12 individually. The first computing infrastructure 14 can operate the client device 12 in normal operation, i.e. when no faults occur, for example. The first computing infrastructure 14 can also be referred to as the primary computing infrastructure. The second computing infrastructure 16 can operate the client device 12 in redundant operation instead of the first computing infrastructure 14. The second computing infrastructure 16 can also be referred to as the redundancy computing infrastructure.

For example, the client device 12 may comprise at least one device 18 for acquiring a current sensor signal and at least one device 20 for executing an operating command. The first and second computing infrastructure 14, 16 can each have a software stack or a software component 22, 24.

The device 18 can acquire and output current sensor signals from one or more sources. Sensor signals can be conveniently acquired by the device 18 at a high clock rate, e.g. in the two-digit ms range. For example, the device 20 may comprise an environment detection sensor device and/or internal sensor devices of the client device 12. The sensor devices can acquire a sensor signal either contactlessly or by contact. The sensor devices can be, for example, a radar, a laser scanner (Lidar), an ultrasonic sensor, a speed sensor, an acceleration sensor, a distance sensor, an angle sensor, a position sensor (or position determination system—e.g. GPS), a thermometer, a hygrometer, a pressure gauge, and/or a microphone.

The device 18 may also have a user input device that allows user inputs in the form of sensor signals to be captured. The user input device can capture user input visually, acoustically, and/or haptically. For example, the user input device can comprise a camera, a switch, a keyboard, a mouse, a knob, a controller, a touch-sensitive display, a microphone and/or any other control device.

The device 20 can execute received operating commands to operate the client device 12. Operation of the client device 12 can thus be adapted according to the operating commands received. The client device 12 can receive an operational command to operate client device 12 from the computing infrastructures 14, 16.

The device 20 can comprise, for example, at least one actuator, e.g. steering actuator, drive, valve, etc. The device 20 may also have a user output device that allows information to be output to a user. The user output device can output information visually, acoustically, and/or haptically. For example, the user output device may have a display, a loudspeaker, a signal emitter, etc.

In normal operation, the software component 22 of the first computing infrastructure 14 can send operating commands to the client device 12 to operate the client device 12. In redundant operation, the software component 24 of the second computing infrastructure 16 can send operating commands to the client device 12 to operate the client device 12. For example, the software components 22 in normal operation and the software component 24 in redundant operation can receive signals from the at least one device 18, process them to generate operating commands, and send the generated operating commands to the client device 12 to operate the at least one device 20 of the client device 12.

In principle, the software components 22, 24 can be designed identically. For example, the software components 22, 24 can each have a status modeller 26, 28, an environment modeller 30, 32 and/or an operating command generator 34, 36, which can each preferably be implemented as functional units of a software program.

The status modeller 26, 28 can have a data-based representation or status model of the client device 12. If the client device 12 interacts with an environment, a data-based environment model can also be additionally included here. Based on the received sensor signals of the client device 12 and, if applicable, the environment model, the status model can be updated. For example, a current status or state of the client device 12 can be constantly modelled. For each time step, the status modeller 26, 28 can transfer relevant model parameters to the operating command generator 34, 36. The model parameters can be derived from the status model taking into account the sensor signals of the client device 12 and, if applicable, the environment model, e.g. via characteristic maps, tables, mappings, algorithms etc. The model parameters can be selected depending on the client device 12. In addition, the sensor signals of the client device 12 can be output to the operating command generator 34, 36.

The environment modeller 30, 32 can have a data-based representation of the environment of the client device 12 and output it as an environment model to the status modeller 26, 28. It is possible that the environment model is fixed and invariant, e.g. map data. However, it is also possible that the environment modeller 30, 32 can customize the environment model, for example, in response to an interaction between the client device 12 on the actual environment (e.g. construction machine, production machine). Changes to the environment model can be adapted, for example, via information derived from the sensor signals of the client device 12.

It is possible that the environment model is created using machine learning only when the client device 12 is in use (e.g. SLAM) and/or is updated or optimized during operation, e.g. using sensor signals from the client device 12. It is also possible that the environment model (possibly experience-based) can allow for or predict the spontaneous appearance of non-mapped obstacles during autonomous navigation.

The operating command generator 34, 36 can receive the model parameters of the status modeller 26, 28 and optionally the associated sensor signals of the client device 12. Using planning/control and/or closed-loop control functions, the operating command generator 34, 36 can generate operating commands from the model parameters and optionally from the associated sensor signals of the client device 12. The operating commands can be sent to the client device 12 via a communication interface of the respective computing infrastructure 14, 16.

A special feature of the present disclosure is the control of the redundant operation (redundant control), specifically, how the system switches into the redundant operation. While the first computing infrastructure 14 operates the client device 12, the client device 12 monitors communication between the client device 12 and the first computing infrastructure 14 for the occurrence of a fault. If a fault occurs, the client device 12 instructs the second computing infrastructure 16 to operate the client device 12 or to take over operation of the client device 12.

The fault can comprise, for example, a disconnection of the communication, a communication failure, a violation of a predefined maximum response time of the first computing infrastructure 14 and/or a violation of a predefined minimum data transfer speed of the first computing infrastructure 14. For example, the fault can be directly caused by a communication fault, e.g. packet loss, failure of communication nodes, etc. The fault can also be indirectly caused by the first computing infrastructure 14, e.g. (partial) failure of the first computing infrastructure 14.

For example, the client device 12 may comprise a monitor 38, a computing infrastructure register 40, and/or a redundant control section 42.

The monitor 38 can monitor the communication with the first computing infrastructure 14 for the occurrence of a fault. Preferably, the monitor 38 can be implemented as hardware and/or as functional units of a software program. Preferably, the monitor 38 can monitor a quality of service (QoS) of the communication with the first computing infrastructure 14. For example, a latency time (end-to-end transmission delay), a jitter (deviation of the latency from its mean value), a packet loss rate (probability that individual IP packets are lost during transmission or—in the case of real-time services—reach their destination too late) and/or a throughput (average volume of data transmitted per unit time) can be monitored and evaluated, for example by the monitor 38 or the redundant control section 42.

The monitor 38 can output information regarding the monitoring, in particular regarding the occurrence of a fault, to the redundant control section 42. The redundant control section 42 can evaluate the information received from the monitor 38. The evaluation may comprise identifying whether the current fault has occurred at the network level or communication level, or at the level of the first computing infrastructure 14, or, in case of doubt, at both levels.

When the occurrence of a fault is detected, the redundant control section 42 can instruct the second computing infrastructure 16 to (continue) to operate the client device 12. Optionally, the redundant control section 42 can obtain an address of the second computing infrastructure 16 from the computing infrastructure register 40. The computing infrastructure register 40 can be updated via the first computing infrastructure 14, for example. According to the instruction, the second computing infrastructure 16 can forward operating commands to the client device 12, preferably to operate the at least one device 20 of the client device 12.

The client device 12, preferably the redundant control section 42 of the client device 12, can instruct the second computing infrastructure 16, for example via a constantly active communication link between the client device 12 and the second computing infrastructure 16, to operate the client device 12. Alternatively, the client device 12, preferably the redundant control section 42 of the client device 12, can e.g. initiate or establish a communication link between the client device 12 and the second computing infrastructure 16 first and then use it to instruct the second computing infrastructure 16 to operate the client device 12.

For example, the client device 12, preferably its redundant control section 42, can simultaneously instruct the second computing infrastructure 16 and attempt to switch to another communication channel (for example, from wireless network over 4G or 5G to WiFi connection) between the client device 12 and the first computing infrastructure 14. Alternatively, the client device 12, preferably its redundant control section 42, can only instruct the second computing infrastructure 16, for example, after an unsuccessful attempt has been made to switch to another communication channel between the client device 12 and the first computing infrastructure 14.

During operation of the client device 12 via the second computing infrastructure 16, the client device 12 can continue to monitor the communication with the first computing infrastructure 14, e.g. via the monitor 38. If the client device 12, preferably the redundant control section 42 and/or the monitor 38, detects that the fault has been eliminated, the client device 12 can instruct the first computing infrastructure 14 to operate the client device 12 again. In addition, the client device 12 can instruct the second computing infrastructure 16 to terminate the operation of the client device 12. Alternatively or in addition, the client device 12 can terminate or disable communication with the second computing infrastructure 16.

It is possible that the second computing infrastructure 16 can be operated as a so-called hot redundancy (first and second computing infrastructure 14, 16 perform the same functions in parallel), a warm or cold or standby redundancy (second computing infrastructure 16 only works fully, if at all, when it is switched to). In a development, it is possible that a status of the second computing infrastructure 16 can be switched between a hot redundancy and a warm or cold or standby redundancy. For example, a switch can be performed depending on resource optimization or resource adaptation of the distributed automation system 10, depending on a status of the client device 12 and/or a status of the communication between the client device 12 and the first computing infrastructure 14. The switch can be initiated by the first client device 12 and/or the first computing infrastructure 14.

It is also possible that the client device 12 is capable of operating itself or independently, at least temporarily without external operation, using the first or second computing infrastructure 14, 16. For this purpose, the client device 12 can have a redundant operation component 44 on the hardware and software side, for example. The redundant operation component 44 can operate the client device 12 independently. For example, the redundant operation component 44 can receive signals from the at least one device 18 and/or issue operating commands to the at least one device 20. The redundant operation component 44 can have a reduced functionality compared to operation using the first and second computing infrastructure 14, 16. For example, only a part of the signals from the at least one device 18 may be processed or evaluated and/or only a part of the at least one device 20 can be instructed with operating commands. For example, the redundant operation component 44 can run a SLAM algorithm with reduced performance compared to running using the first computing infrastructure 14.

Once the fault has occurred, the redundant operation component 44 can operate the client device 12 with a reduced functionality compared to operating using the first computing infrastructure 14, for example, until the second computing infrastructure 16 operates the client device 12 or takes over the operation of the client device 12.

Alternatively, in certain situations, preferably depending on the fault that has occurred, on a status of the client device 12 and/or a status of the second computing infrastructure 16, the client device 12 may decide that when the fault occurs the second computing infrastructure 16 will not be instructed to operate the client device 12, but instead the client device 12 will operate itself with a reduced functionality, preferably temporarily. Such a situation can occur, for example, if the fault is only a minor one, if communication with the second computing infrastructure 16 is disrupted (e.g. monitored by the monitor 38), and/or if the client device 12 decides accordingly for other reasons.

It is possible that for selecting an optimal method variant (e.g. use of the redundant operation component 44 as redundancy, or use of the second computing infrastructure 16 as redundancy, or optionally changing the communication channel with the first computing infrastructure 14), instructions (optimization functions) can be provided that can be executed, for example, by the redundant control section 42. Preferably, the selection can thus be dynamically adapted to changed circumstances. For example, a self-optimization based on criteria, e.g. minimizing the latencies, can be provided using exploratory machine learning methods. In this context, an optimal (dynamic) configuration can be determined, for example, by providing a wide range of communication and calculation options. In this sense, the method can also be extended in order to use the optimal integration of possible infrastructures automatically on the device side at all times and to maintain redundancies based on an optimized strategy at the same time.

As explained, it may be possible for the client device 12 to be operated by the first computing infrastructure 14 using a continuously updating status model of the status modeller 26. Preferably, this status model can be made available in the latest version of the second computing infrastructure 16 so that the second computing infrastructure 16 can operate the client device 12. The status model can preferably be made available to the status modeller 28 of the second computing infrastructure 16.

For example, the current status model can be continuously transferred from the first computing infrastructure 14 (e.g. directly) to the second computing infrastructure 16 while the first computing infrastructure 14 is still operating the client device 12. The second computing infrastructure 16 can then use the current or most recently transferred status model to operate the client device 12 while the second computing infrastructure 16 operates the client device 12 when the fault occurs, or when the client device 12 instructs the second computing infrastructure 16 to operate the client device 12.

Alternatively or in addition, the current status model can be continuously transferred from the first computing infrastructure 14 to the client device 12 while the first computing infrastructure 14 is still operating the client device 12. The current status model can be stored in a status model storage section 46 of the client device 12. The status model stored in the status model storage section 46 can be transferred from the client device 12 to the second computing infrastructure 16 when the client device 12 instructs the second computing infrastructure 16 to operate the client device 12.

It is possible that the technique relating to the redundant provision of the status model is applied correspondingly to a redundant provision of the environment model of the client device 12, if present and if so desired.

In the event of a possible reconnection to the first computing infrastructure 14 after the elimination of the fault, the current status model and/or the current environment model can in turn be transferred to the first computing infrastructure, e.g. by the client device 12 or the second computing infrastructure 16.

One way to compensate for the delay until the activation of the redundant operation component 44 or until the activation of the second computing infrastructure 16 can be provided by the predictive transmission of operating command hypotheses from the first computing infrastructure 14. A similar technique is disclosed in the European Patent Application No. 20176760.5, dated 27 May 2020, entitled "Method and Apparatus for Latency Compensation", which is included or incorporated herein with respect to the method and the apparatus for latency compensation by explicit reference.

It is possible that the client device 12 does not merely respond to a fault that has already occurred in the communication with the first computing infrastructure 14. In addition, the client device 12 can operate predictively and predict any malfunction that may occur. To do this, the client device 12, preferably its redundant control section 42, can predict the occurrence of a communication fault between the client device 12 and the first computing infrastructure 14. For example, the prediction may be based on a current location of the client device 12, a quality-of-service monitoring of the communication, and/or historical information about earlier or previous communication between the client device 12 and the first computing infrastructure 14. Artificial intelligence methods can also be used for the prediction. If multiple client devices are present in the distributed automation system 10, information or experience ("shared experience") of the other client devices can also be used for the prediction.

When predicting the fault, the client device 12, preferably its redundant control section 42, can instruct the second computing infrastructure 16 to operate the client device 12 during a period of time for which the failure was predicted. Alternatively, the client device 12 can operate itself or independently with a reduced functionality during the period of time for which the fault was predicted, e.g. via the redundant operation component 44.

Figure 2:
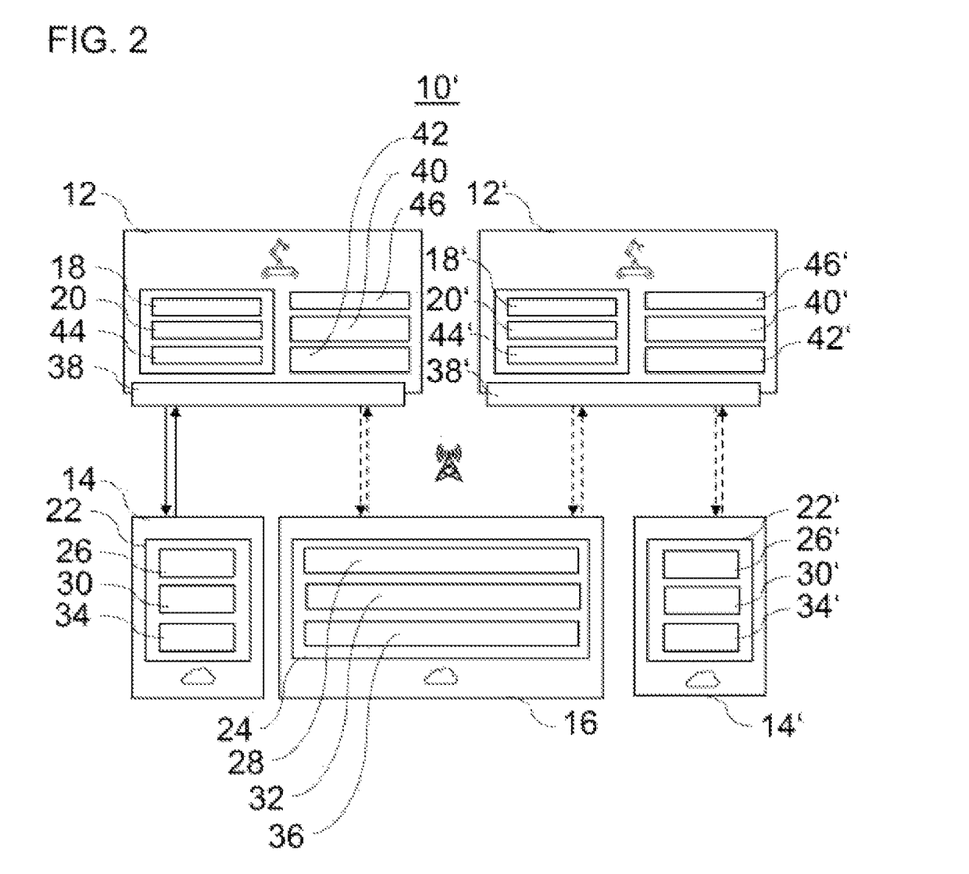
FIG. 2 shows a schematic, simplified representation of a distributed automation system according to another exemplary embodiment of the present disclosure.

FIG. 2 shows, purely as an example, how the redundant control, an example of which was explained using FIG. 1, can be scalable.

The distributed automation system 10' of FIG. 2 shows (at least) one additional client device 12' compared to FIG. 1, and a third computing infrastructure 14'. The additional client device 12' can be configured at least partly like the client device 12 or otherwise. The third computing infrastructure 14' can be configured at least partly like the first computing infrastructure 14 or otherwise. The third computing infrastructure 14' can operate the additional client device 12' in normal operation. The additional client device 12', preferably its monitor 38', can monitor communication between the additional client device 12' and the third computing infrastructure 14' for an occurrence of a fault. If a fault occurs, the additional client device 12', preferably its redundant control section 42', can instruct the second computing infrastructure 16 to operate the second client device 12'.

Referring to FIG. 1 again, a specific exemplary embodiment will be described below in order to explain the techniques disclosed herein once again using an example.

In this exemplary embodiment, a mobile robot system is considered as the client device 12, the software services of which for autonomous navigation and advanced environmental perception functions are partially outsourced to an edge-cloud environment as the first computing infrastructure 14. Here, for example, the sensor values of the device 18 are sent directly to the edge-cloud environment and the mobile robot system itself only accepts the corresponding actuator commands for the device 20 in a fixed cycle. Some of the outsourced functions are subject to real-time requirements for autonomous navigation, others are non-real-time critical software services for environmental perception, e.g. 3D mapping, that benefit from the performance of the edge-cloud environment. The edge-cloud environment is connected to the mobile robot system via a 5G radio link, which in regular operation ensures the QoS requirements with respect to latency and bandwidth. As redundancy, at the network level (locally) a LiFi network is available as an additional communication channel, and for the provision of computing infrastructure a public cloud environment is available as the second computing infrastructure 16. For the calculation of the navigation, status information is required, which e.g. manages the position of the mobile robot system on an environment map. The additional image processing services are status-less.

In the event of a failure of the primary 5G network connection, this would be detected via the mobile robot system and a seamless transition to the LiFi network will take place. The active use of network redundancy is also actively triggered if the mobile robot system travels around areas of the environment where experience indicates that the 5G network has poor coverage or increased interference occurs. If the edge-cloud environment fails, or resource problems occur there, or the communication links to the edge-cloud environment fail, the public cloud environment is activated, which maintains a redundant software stack as the software component 22. To save resources, the public cloud environment is initially passive, i.e. a number of control cycles must be allowed to elapse until status information is transferred from the mobile robot system and the software stack on the public cloud environment is activated. In this case, until the transfer a local redundancy, i.e. the redundant operation component 44 of the mobile robot system, with lower performance e.g. for optimized path planning but still with functional autonomous navigation, initially takes over.

It is possible that the redundant public cloud environment does not have latencies comparable to the nearer edge-cloud environment, so it can be assumed that the software services are running in the public cloud environment with limited performance or functionality. If the real-time requirements cannot be fulfilled here, an optimization could ensure that these individual functions/services also continue to run locally on the mobile robot system (also as hot redundancy if necessary). The same applies in principle to the non-real-time critical image processing functions, wherein between the instances there may be performance differences or uncertainties in the calculation due to different implementations or variants of the services with regard to the infrastructures. For the purpose of optimization and defined performance criteria, (active) redundancies would also be generated dynamically here and the optimized results would be reused. This also refers to implementations of software functions using different approaches, which run in parallel and under certain circumstances each have measurable advantages or disadvantages. In this context, a fundamental change of methodology, e.g. the change from 3D to 2D navigation, can also be considered.

If a second mobile robot system is assumed as the additional client device 12' according to FIG. 2, the software stack of the redundancy can be scaled horizontally in each case. The optimization now affects multiple agents that share network and computing resources. In this sense, the optimization problem is extended to multiple agents which can negotiate the resource allocation dynamically among one another, for example.

The invention is not limited to the preferred exemplary embodiments described above. On the contrary, a large number of variants and variations are possible, which also make use of the idea of the invention and therefore fall within the scope of protection. In particular, the features of the independent claims are disclosed independently of each other. In addition, the features of the subclaims are also disclosed independently of all the features of the independent claims.

LIST OF REFERENCE SIGNS 10 distributed automation system
12 client device
14 first computing infrastructure (primary computing infrastructure)
16 second computing infrastructure (redundant computing infrastructure)
18 device
20 device
22 software component
24 software component
26 status modeller
28 status modeller
30 environment modeller
32 environment modeller
34 operating command generator
36 operating command generator
38 monitor
40 computer infrastructure register
42 redundant control section
44 redundant operation component
46 status model storage section

What is claimed is:

1. A method for redundant control in a distributed automation system, preferably a real-time automation system, for operating a client device of the distributed automation system, comprising:
using the client device to monitor for an occurrence of a fault in communication between the client device and a first computing infrastructure that is part of the distributed automation system and operates the client device,
upon the occurrence of the fault, using the client device to instruct a second computing infrastructure of the distributed automation system to operate the client device,
wherein the client device is operated by the first computing infrastructure via a status model, which indicated a current status of the client device, and the method further comprises:
transferring the status model from the first computing infrastructure to the client device while the first computing infrastructure operates the client device, and
using the client device, transferring the transferred status model to the second computing infrastructure for operating the client device when instructing the second computing infrastructure.

2. The method according to claim 1, wherein:
the instruction to the second computing infrastructure is issued via a continuously active communication link between the client device and the second computing infrastructure; or the instruction to the second computing infrastructure includes establishing a communication link between the client device and the second computing infrastructure, initiated via the client device.

3. The method according to claim 1, further comprising:
once the fault is eliminated, using the client device to instruct the second computing infrastructure to at least one of terminate the operation of the client device and terminate communication with the second computing infrastructure.

4. The method according to claim 1, further comprising:
once the fault is eliminated, using the client device to instruct the first computing infrastructure to operate the client device again; and
transferring a current status model, which specifies a current status of the client device, and/or a current environment model, which specifies a current environment of the client device, from the client device or the second computing infrastructure to the first computing infrastructure for use when operating the client device.

5. The method according to claim 1, wherein:
the client device is a machine, a robot, a terminal device, or a preferably autonomous vehicle.

6. The method according to claim 1, wherein:
the fault comprises a disconnection of the communication, a communication failure, a violation of a maximum predefined response time, a violation of a predefined minimum data transfer speed, and/or a deviation from a quality of service requirement on the communication.

7. The method according to claim 1, wherein upon the occurrence of the fault, one of:
operating the client device independently with a reduced functionality compared to the operation using the first computing infrastructure, until the second computing infrastructure operates the client device; and
using the client device to carry out either the instruction of the second computing infrastructure or an independent operation of the client device with a reduced functionality in comparison to the operation via the first computing infrastructure, depending on at least one of the fault that occurred, a status of the client device, and a status of the second computing infrastructure.

8. The method according to claim 1, further comprising:
transferring the status model from the first computing infrastructure to the second computing infrastructure while the first computing infrastructure operates the client device, and
via the second computing infrastructure, using the transferred status model to operate the client device while the second computing infrastructure operates the client device upon the occurrence of the fault.

9. The method according to claim 1, further comprising:
predicting the occurrence of the fault in the communication between the client device and the first computing infrastructure based on at least one of a current location of the client device, a quality-of-service monitoring of the communication, and historical information about previous communication between the client device and the first computing infrastructure.

10. The method according to claim 9, further comprising:
upon predicting the occurrence of the fault, using the client device to instruct the second computing infrastructure to operate the client device during a period of time for which the fault was predicted; or
upon predicting the occurrence of the fault, independently operating the client device with a reduced functionality compared to the operation using the first computing infrastructure in a period of time for which the fault was predicted.

11. The method according to claim 1, further comprising:
using at least one of the client device and the first computing infrastructure device to decide whether the second computing infrastructure is operated at least temporarily as a hot redundancy or as a warm, cold or standby redundancy with respect to the first computing infrastructure, depending on at least one of a status of the client device, a status of the first computing infrastructure, the communication between the client device and the first computing infrastructure, and the prediction of the occurrence of a fault in the communication between the client device and the first computing infrastructure.

12. The method according to claim 1, wherein the distributed automation system comprises an additional client device, the method further comprising:
using the additional client device to monitor for the occurrence of a fault in communication between the additional client device and a third computing infrastructure of the distributed automation system that operates the additional client device; and
upon the occurrence of the fault, using the additional client device to instruct the second computing infrastructure of the distributed automation system to operate the additional client device.

13. A distributed automation system having a client device, a first computer infrastructure and a second computer infrastructure, wherein the distributed automation system is configured to carry out the method according to claim 1.

14. A computer program product comprising at least one computer-readable storage medium with instructions stored thereon, which instruct one or more computers to carry out the method according to claim 1.

15. The method according to claim 1, wherein the transferring the status model from the first computing infrastructure to the client device includes continuously transferring the status model from the first computing infrastructure to the client device while the first computing infrastructure operates the client device.

16. The method according to claim 8, wherein the transferring the status model from the first computing infrastructure to the second computing infrastructure includes continuously transferring the status model from the first computing infrastructure to the second computing infrastructure while the first computing infrastructure operates the client device.

* * * * *